United States Patent
Wong et al.

(10) Patent No.: US 6,376,045 B1
(45) Date of Patent: *Apr. 23, 2002

(54) HAND TEARABLE PATTERNED RETROREFLECTIVE MATERIAL

(75) Inventors: Wilkey Wong, Coventry, RI (US); Jerry M. Serra, Chelmsford; Richard J. Klipp, Mansfield, both of MA (US)

(73) Assignee: Tyco Adhesives LP, Norwood, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,501

(22) Filed: May 24, 1999

(51) Int. Cl.⁷ .............................................. G02B 5/128
(52) U.S. Cl. ..................... 428/143; 428/325; 428/195; 428/343; 359/538
(58) Field of Search ................. 428/143, 325, 428/195, 343; 359/538

(56) References Cited

U.S. PATENT DOCUMENTS

| | | | |
|---|---|---|---|
| 3,618,754 A | * 11/1971 | Hoey ........................... 206/59 |
| 3,700,305 A | 10/1972 | Bingham .................... 350/105 |
| 3,801,183 A | 4/1974 | Sevelin et al. .............. 350/105 |
| 3,853,598 A | 12/1974 | Raguse ..................... 117/76 A |
| 4,285,748 A | 8/1981 | Booker et al. .............. 156/167 |
| 4,332,437 A | 6/1982 | Searight et al. ............. 350/103 |
| 4,367,920 A | 1/1983 | Tung et al. ................. 350/105 |
| 4,581,087 A | 4/1986 | Johnson ..................... 156/209 |
| 4,605,461 A | 8/1986 | Ogi ............................. 156/233 |
| 4,629,663 A | 12/1986 | Brown et al. ............... 428/343 |
| 4,645,711 A | 2/1987 | Winslow et al. ............ 428/355 |
| 4,656,072 A | 4/1987 | Coburn, Jr. et al. .......... 428/40 |
| 4,699,842 A | 10/1987 | Jorgensen et al. .......... 428/343 |
| 4,767,659 A | 8/1988 | Bailey et al. ............... 428/203 |
| 4,781,957 A | * 11/1988 | Brown et al. ................. 428/43 |
| 4,801,193 A | 1/1989 | Martin ....................... 350/103 |
| 4,955,690 A | 9/1990 | Bacon, Jr. .................. 350/105 |
| 5,055,347 A | 10/1991 | Bacon, Jr. ................... 428/250 |
| 5,066,098 A | 11/1991 | Kult et al. .................. 359/540 |
| 5,069,964 A | 12/1991 | Tolliver et al. .............. 428/325 |
| 5,110,655 A | 5/1992 | Engler et al. ................ 428/143 |
| 5,200,262 A | 4/1993 | Li ............................... 428/266 |
| 5,223,312 A | 6/1993 | Langille ....................... 428/31 |
| 5,229,882 A | 7/1993 | Rowland .................... 359/530 |
| 5,254,390 A | 10/1993 | Lu .............................. 428/156 |
| 5,316,838 A | 5/1994 | Crandall et al. ............ 428/283 |
| 5,378,520 A | 1/1995 | Nagaoka et al. .............. 428/72 |
| 5,415,911 A | 5/1995 | Zampa et al. ................. 428/40 |
| 5,468,540 A | 11/1995 | Lu .............................. 428/156 |
| 5,485,311 A | 1/1996 | McAllister .................. 359/530 |
| 5,508,105 A | 4/1996 | Orensteen .................. 428/323 |
| 5,514,441 A | 5/1996 | Pohto et al. .................. 428/72 |
| 5,612,119 A | 3/1997 | Olsen et al. ................ 428/195 |
| 5,624,731 A | 4/1997 | Desjardins .................. 428/143 |
| 5,631,064 A | 5/1997 | Marecki ..................... 428/143 |
| 5,639,530 A | 6/1997 | Miron et al. ............... 428/40.1 |
| 5,650,213 A | 7/1997 | Rizika et al. ............... 428/143 |
| 5,679,190 A | * 10/1997 | Riedel et al. ............... 156/62.2 |
| 5,738,746 A | 4/1998 | Billingsley et al. ......... 156/239 |
| 5,795,834 A | * 8/1998 | Deeb et al. ................... 442/62 |
| D397,555 S | 9/1998 | Nestegard ..................... D5/99 |
| 5,837,347 A | 11/1998 | Marecki ..................... 428/143 |
| 5,880,885 A | 3/1999 | Bailey et al. ............... 359/529 |

FOREIGN PATENT DOCUMENTS

| | | |
|---|---|---|
| GB | 1 407 032 | 9/1975 |
| WO | WO 94 25666 | 11/1994 |

* cited by examiner

*Primary Examiner*—William P. Watkins, III
(74) *Attorney, Agent, or Firm*—Banner & Witcoff, Ltd.

(57) ABSTRACT

A retroreflective adhesive material has a retroreflective composition including retroreflective elements protruding from a first surface of a binder layer. A carrier web is secured to a second surface of the binder layer. The retroreflective adhesive material also includes a pressure sensitive adhesive layer. In certain preferred embodiments, a removable release liner covers the pressure sensitive adhesive. Retroreflective pattern elements are formed by the retroreflective composition, and the retroreflective material is clean-edge hand tearable. In certain embodiments, the carrier web is formed of fabric.

28 Claims, 5 Drawing Sheets

HAND TEARABLE PATTERNED RETROREFLECTIVE MATERIAL

INTRODUCTION

The present invention is directed to retroreflective material, and, more particularly, to material having a retroreflective pattern and which is hand tearable.

BACKGROUND

Retroreflective materials are well known for providing good visibility by brilliantly reflecting light back toward a light source. Existing retroreflective materials have various shortcomings, and new use applications call for retroreflective materials having new and improved characteristics.

U.S. Pat. No. 5,110,655 to Engler et al. discloses a retroreflective marking material for use on firefighters helmets. The marking material contains a fire resistant fabric which is resistant to tearing and has a uniform retroreflective appearance. The marking material is typically applied to a firefighter's helmet, which aids in identification of the firefighter in smoky, hazardous conditions. The marking material must be cut into a desired pattern, e.g. the identification number of a particular firefighter.

It is an object of the present invention to provide new retroreflective material having characteristics which reduce or wholly overcome some or all of the difficulties inherent in prior known materials. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide flexible retroreflective adhesive materials, such as retroreflective adhesive tapes, which have retroflective patterns and which are clean-edge hand tearable.

In accordance with a first aspect, a flexible retroreflective adhesive material has carrier web. A retroreflective composition layer carries pattern elements on selected portions of the carrier web. The retroreflective composition layer has retroreflective elements protruding from a surface of a binder layer adhered to the carrier web. The flexible retroreflective adhesive material also has a pressure sensitive adhesive layer, and is clean-edge hand tearable through the pattern elements.

In accordance with another aspect, a flexible retroreflective adhesive tape has a carrier web. A retroreflective composition layer carries pattern elements on selected portions of the carrier web. The retroreflective composition layer has retroreflective elements protruding from a surface of a binder layer adhered to the carrier web. The flexible retroreflective adhesive tape also has a pressure sensitive adhesive layer, and is clean-edge hand tearable through the pattern elements.

Substantial advantage is achieved by providing flexible fabric-backed adhesive material having a retroreflective pattern and which is hand tearable. In particular, a tape is produced which can easily be torn to a desired length and applied to a surface when an adhesive is applied to a surface of the tape. This is highly advantageous since an individual can quickly, cleanly, and easily produce a desired length of retroreflective tape without special tools or equipment. Other advantages include the ability to dispense tape without risking injury with the use of sharp cutting or trimming devices.

These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
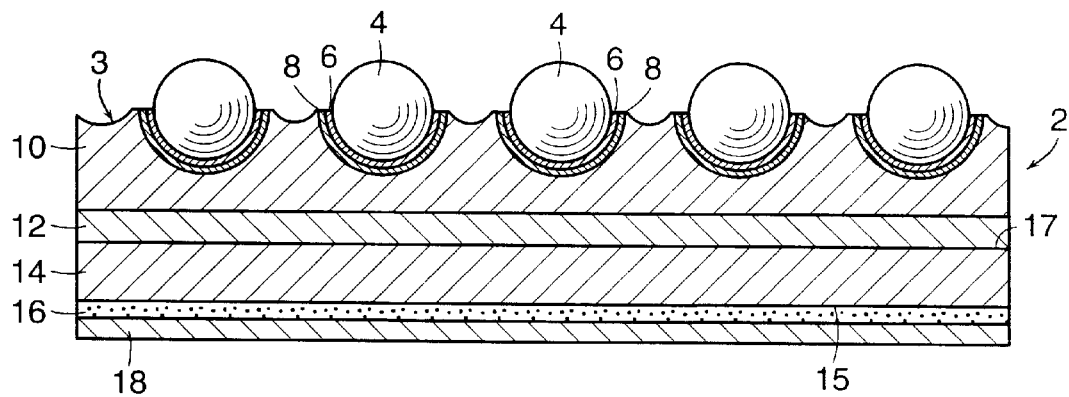
FIG. 1 is a schematic section view, shown partially cut away, of a flexible retroreflective adhesive material in accordance with a first preferred embodiment of the present invention.

The figures referred to above are not drawn necessarily to scale and should be understood to present a representation of the invention, illustrative of the principles involved. Some features of the retroreflective tape depicted in the drawings have been enlarged or distorted relative to others to facilitate explanation and understanding. The same reference numbers are used in the drawings for similar or identical components and features shown in various alternative embodiments. Retroflective materials, as disclosed herein, will have configurations and components determined, in part, by the intended application and environment in which they are used.

DETAILED DESCRIPTION OF CERTAIN PREFERRED EMBODIMENTS

Flexible retroreflective adhesive tape 2, as seen in FIG. 1, includes a retroreflective composition or sheet 3 formed of a densely packed layer of microspheres 4 partially embedded in binder layer 10. Each microsphere 4 has two transparent coatings 6, 8 which differ in their index of refraction by at least about 0.1, preferably by at least about 0.3, and provide a substantially transparent specularly reflective layer on the rear of microspheres 4. Suitable techniques for the application of such transparent coatings 6, 8 to microspheres 4 are well known to those skilled in the art and further description need not be provided here. An alternative method of producing retroreflective microspheres is described in U.S. Pat. No. 5,650,213, where a single layer of aluminum is deposited on microspheres. Alternative suitable techniques will be apparent to those skilled in the art, given the benefit of this disclosure. Such suitable techniques will be apparent to those skilled in the art, given the benefit of this disclosure. Binder layer 10 is adhered via bonding adhesive 12 to carrier web 14. Suitable bonding adhesives include, for example, urethanes, rubbers, silicones and acrylics. Alternative suitable bonding adhesives will be apparent to those skilled in the art, given the benefit of this disclosure. Pressure sensitive adhesive 16 covers the exposed surface 15 of carrier web 14 (i.e., the surface not facing toward binder layer 10 and adhesive layer 12) and release liner 18 covers pressure sensitive adhesive 16. When release liner 18 is removed, adhesive 16 is exposed, allowing tape 2 to be applied to a desired surface. Tape 2 is typically provided in roll form in order to provide ease of handling.

Alternatively, a release liner would not be required in the case where tape 2 would be wound upon itself in roll form such that the surface of adhesive layer 16 is in direct contact with the upper surface of the retroreflective composition or sheet 3.

Figure 2:
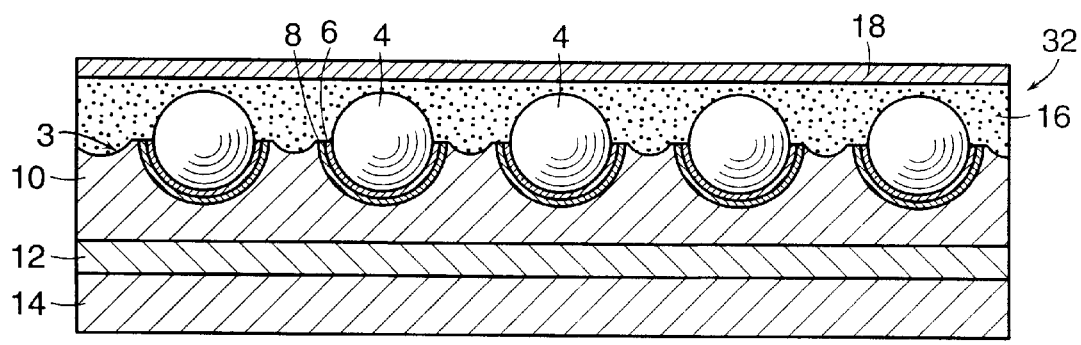
FIG. 2 is a schematic section view, shown partially cut away, of an alternative embodiment of the flexible retroreflective adhesive material of FIG. 1.

Pressure sensitive adhesive 16 may alternatively be applied to the upper surface of retroreflective sheet 3, thereby covering binder layer 10 and microspheres 4, as seen in FIG. 2. Release liner 18 is then applied over pressure sensitive adhesive 16. In this embodiment, pressure sensitive adhesive 16 is, naturally, transparent to visible light. Thus, tape 32 may be applied behind a transparent surface such as a glass window, allowing an individual to view the retroreflective tape through the window.

Pressure sensitive adhesive 16 has, in certain preferred embodiments, a thickness of approximately 25 to 250 microns. Pressure sensitive adhesive 16 may be, for example, rubber, silicone, acrylic or urethane. In a preferred embodiment, pressure sensitive adhesive 16 is a residue-free adhesive. Residue-free adhesive, as used herein, refers to an adhesive which strips cleanly and leaves substantially no sticky residue behind when tape 2 is removed from a surface to which it has been adhered. Tape 2 may, in certain preferred embodiments, be adhered to, and stripped cleanly from, polished surfaces, including metals such as aluminum, steel, iron, copper, brass and galvanized steel. In other preferred embodiments, tape 2 may be adhered to, and stripped cleanly from, fabric or cloth surfaces such as cotton fabric, fiberglass, nylon, polyester, and blends thereof In other preferred embodiments, tape 2 may be adhered to, and stripped cleanly from, other surfaces such as leather, vinyl, glass, plastic surfaces (e.g., olefins, nylons, polystyrene), wood, and rubber. Examples of residue-free adhesives include urethanes, silicones, acrylics and rubbers in either crosslinked or uncrosslinked states.

Figure 10:
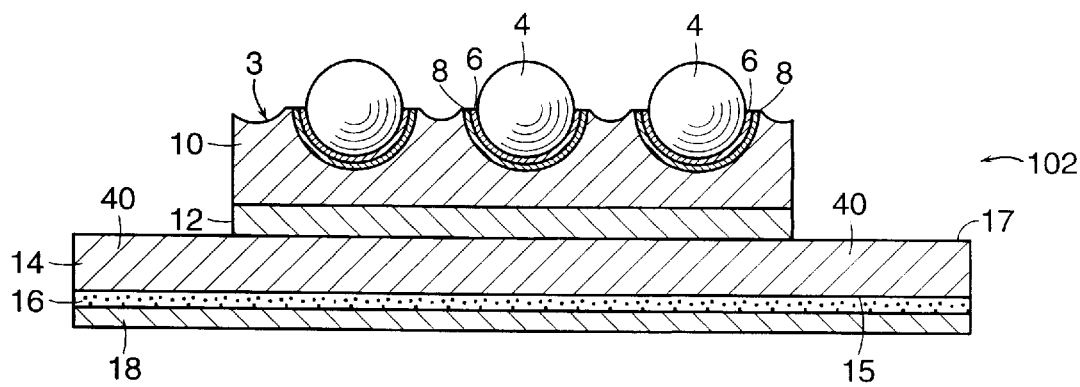
FIG. 10 is a schematic section view, shown partially cut away, of an alternative embodiment of the flexible retroreflective adhesive material of FIG. 1 taken along lines 10—10 of FIG. 5.

In certain preferred embodiments, as seen in FIG. 10, retroreflective composition 3 is disposed only along a portion of carrier web 14, leaving surface 17 of carrier web 14 exposed at those areas not covered by retroreflective composition 3.

Microspheres 4 preferably have a diameter of approximately 20 to 100 microns, and more preferably have a diameter of approximately 50 microns. Microspheres 4 are typically glass since glass exhibits good durability, resistance to abrasion, and are less expensive than many polymeric retroreflective elements. Microspheres 4 may be clear or colored. Microspheres 4 may also be formed of polymers (plastics) such as acrylic, or polystyrene, or minerals such as quartz. Other suitable materials for forming microspheres 4 will be readily apparent to those skilled in the art, given the benefit of this disclosure.

When microspheres with specularly reflective layers are used as retroreflective elements in the retroreflective tape, the specularly reflective layers are preferably substantially transparent. As seen in FIG. 1, each microsphere 4 may have two transparent hemispheric coatings 6, 8 on its rear surface which differ in their index of refraction by at least 0.1, preferably by at least 0.3. Preferably, the index of refraction of transparent coating 6 is from about 1.2 to 1.7, and the index of refraction of transparent coating 8 is in from about 1.7 to 3.0. The coatings preferably have a thickness of approximately 5 to 25 microns. These coatings may be referred to as partially-light-transmissive reflective layers. Suitable coatings include $CdS$, $CeO_2$, $CsI$, $GaAs$, $Ge$, $InAs$, $InP$, $InSb$, $ZrO_2$, $Bi_2O_3$, $ZnSe$, $ZnS$, $WO_3$, $PbS$, $PbSe$, $PbTe$, $RbI$, $Si$, $Ta_2O_5$, $Te$, $TiO_2$, $Al_2O_3$, $AlF_3$, $CaF_2$, $CeF_3$, $LiF$, $MgF_2$, $Na_3AlF_6$, $ThOF_2$, $NaCl$, elastomeric copolymers of perfluoropropylene and vinylidene fluoride. Other suitable coatings will become readily apparent to those skilled in the art, given the benefit of this disclosure.

In other preferred embodiments, microspheres 4 can be coated with a single layer of aluminum as described in U.S. Pat. No. 5,650,213.

In certain preferred embodiments, especially when carrier web 14 is a fabric, it or the surface 17 thereof may be somewhat embedded in binder layer 10 or adhesive layer 12. Thus, for example, referring to the embodiment shown in FIG. 1, wherein binder layer 10 is secured to carrier web 14 via bonding adhesive 12, there is, at least along portions of tape 2, no longer a sharp delineation between the surfaces of adhesive layer 12 and carrier web 14 since at least a portion of the adhesive has infiltrated surface 17 of carrier web 14.

Figure 12:
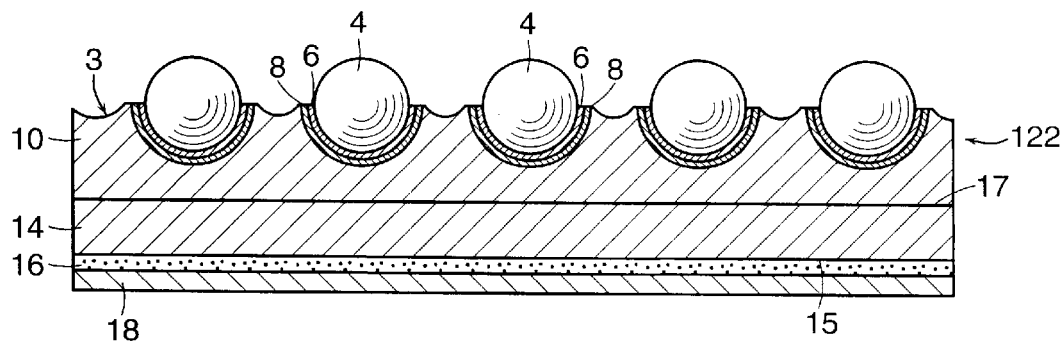
FIG. 12 is a schematic section view, shown partially cut away, of another alternative embodiment of the flexible retroreflective adhesive material of FIG. 1.

In certain preferred embodiments, as seen in FIG. 12, binder layer 10 is secured directly to carrier web 14 without the benefit of a bonding adhesive. Alternatively, for example, there may be, at least along portions of tape 122, no longer a sharp delineation between the surfaces of binder layer 10 and carrier web 14 since at least a portion of binder layer 10 has infiltrated surface 17 of carrier web 14.

Binder layer 10 has, in certain preferred embodiments, a thickness of approximately 10 to 50 microns. It is to be appreciated that binder layer 10 may be pigmented with a desired colorant. Adding colorant to binder layer 10 provides daytime unnoticeability and a variety of coloration, and assists in design ornamentation. Suitable colorants include oxides, copper phthalocyanine blue, pigment yellow 65, or carbozole violet. Suitable pigments are well known in the art.

The tape or other flexible retroreflective adhesive material of the invention is clean-edge hand tearable through the pattern elements. Clean-edge hand tearable, as used herein means the tape or other sheet material can be torn by hand to produce a newly formed edge which is substantially straight and has substantially no curl or jaggedness. In certain especially preferred embodiments, tape 2 is clean-edge hand cross-tearable. That is, the tape can be ripped by hand laterally-across (i.e., at 90° to the longitudinal direction of the tape) with substantially no curl or jaggedness at the newly-formed free end of the tape. Clean-edge hand tearable tapes and materials of the invention meet ASTM test No. D-1424, with a value of 300–1600 grams, and more preferably, with a value of 600–1200 grams. Preferably, the force required to rip the tape by hand must not be excessive, yet the tape must exhibit strength, especially tensile strength, adequate to perform its intended application.

A retroreflective pattern is formed on the tape or other flexible retroreflective adhesive material of the present invention. That is, retroreflective pattern elements are displayed which are visibly different and distinct from the remaining surface of the tape; e.g., the remaining surface may be a contrasting color from the color of the pattern elements. The pattern is preferably visible, i.e., discernable, to the human eye at a distance of, e.g., 20 feet. The pattern may take any desired form, providing the capability of transmitting information, or providing aesthetic appeal, or both.

Figure 3:
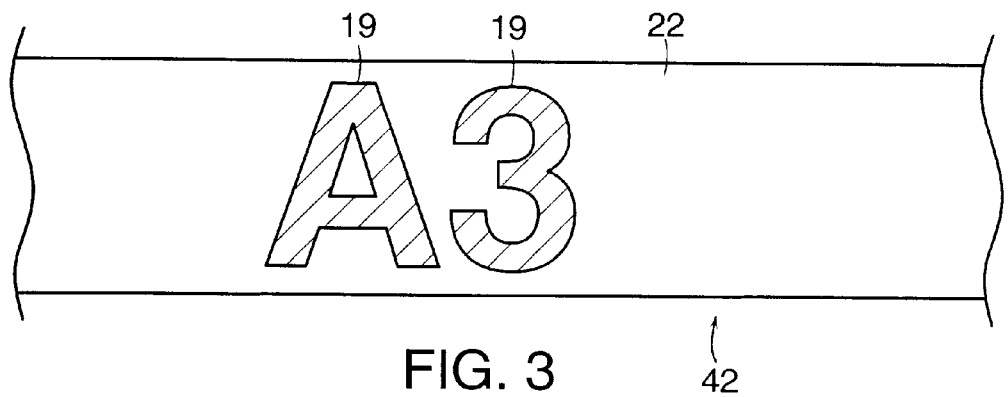
FIG. 3 is a schematic plan view of one embodiment of retroreflective pattern elements of the flexible retroreflective adhesive material of FIG. 1.

In one preferred embodiment, shown in FIG. 3, pattern elements 19 may comprise retroreflective symbols such as alpha-numeric characters, positioned on non-retroreflective background 22. In certain preferred embodiments, reflective tape 42 has a repeating retroreflective pattern.

Figure 4:
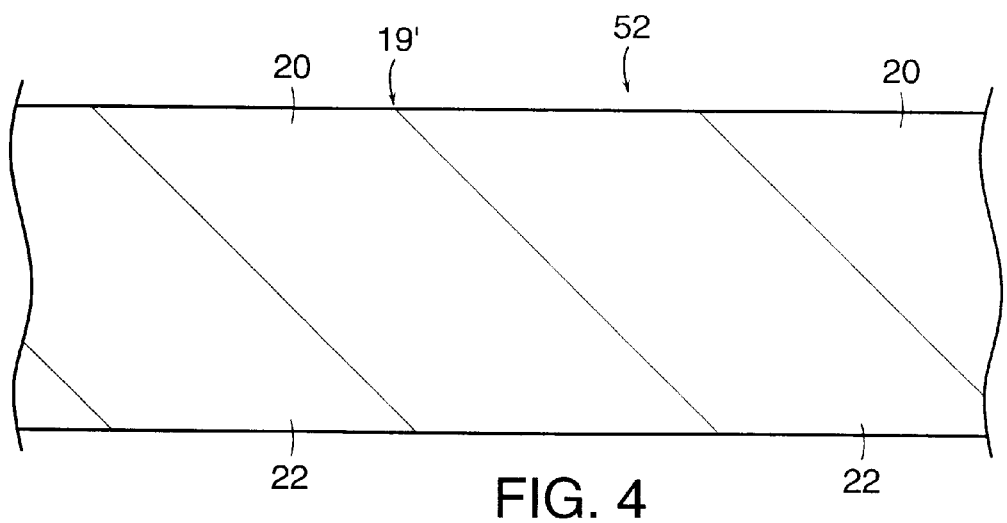
FIG. 4 is a schematic plan view of another embodiment of a retroreflective pattern of the flexible retroreflective adhesive material of FIG. 1 showing a repeating pattern of pattern elements.

In one preferred embodiment, as seen in FIG. 4, pattern elements 19' of reflective tape 52 may comprise a repeating pattern of retroreflective diagonal stripes 20 disposed in alternating fashion with non-retroreflective diagonal stripes 22. Stripes 20 and 22, in the embodiment illustrated, are diagonal stripes having a width, for example, of approximately 2¼" (and about 3" measured along the length of the tape).

Figure 5:
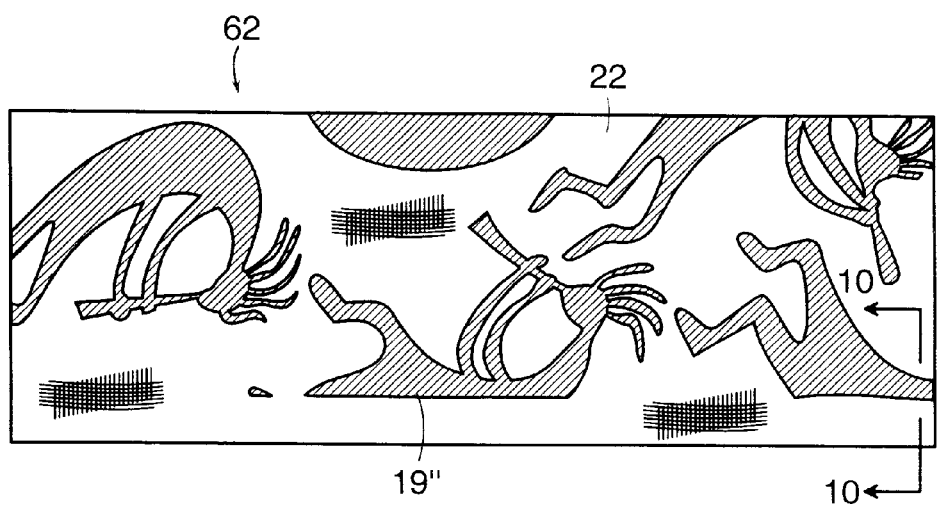
FIG. 5 is a schematic plan view of an alternative embodiment of the retroreflective pattern elements of the flexible retroreflective adhesive material of FIG. 1.

In another preferred embodiment, as seen in FIG. 5, pattern elements 19" of tape 62 may be design elements disposed in a repeating pattern on background 22, where one of pattern elements 19" and background 22 is retroreflective and the other is non-retroreflective.

It is contemplated that in the flexible adhesive material disclosed here, the pattern elements are permanently adhered, or otherwise secured, to the carrier web.

In certain preferred embodiments, the pattern of reflective tape 2 is only readily visible when reflective tape 2 is illuminated with a focused light source, that is, the pattern elements are substantially hidden or not easily discernable when viewed with the naked eye in the absence of retroreflection from a light source. When a light source shines on the reflective tape 2, the microspheres 4 of the pattern elements reflect light, revealing the pattern. Such a hidden pattern may be formed in various ways.

Figure 9:
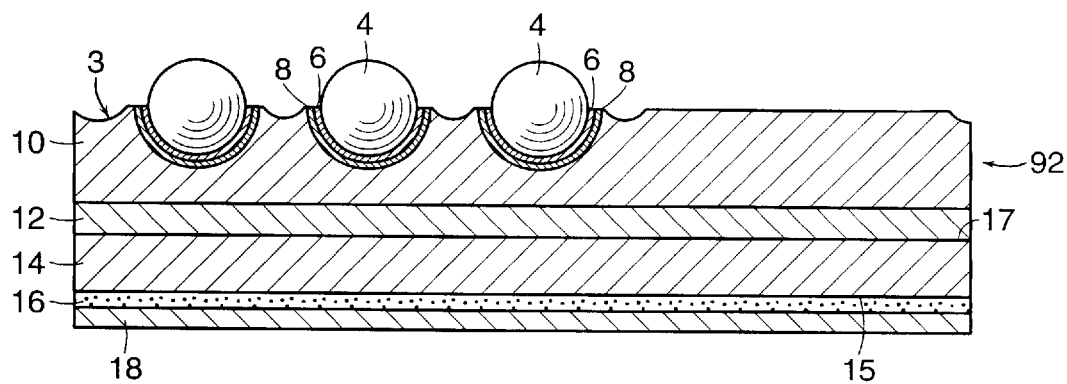
FIG. 9 is a schematic section view, shown partially cut away, of another alternative embodiment of the flexible retroreflective adhesive material of FIG. 1.

In one preferred embodiment, binder layer 10 is colored and covers the entire surface of tape 92, as seen in FIG. 9. In this embodiment, retroreflective microspheres 4 are disposed across only a portion of binder layer 10 in the form of pattern elements. Thus, the pattern is revealed only when tape 92 is illuminated with a light source.

Figure 6:
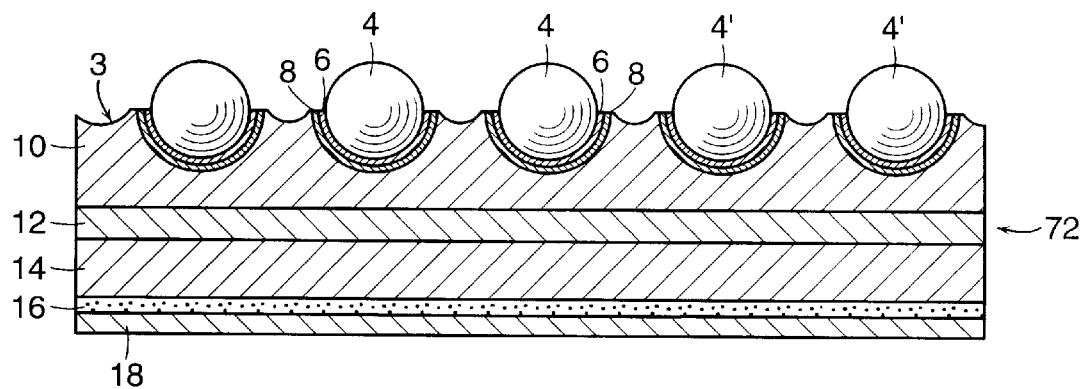
FIG. 6 is a schematic section view, shown partially cut away, of an alternative embodiment of the flexible retroreflective adhesive material of FIG. 1.

In another preferred embodiment, as seen in FIG. 6, binder layer 10 is colored and covers the entire surface of tape 2. In this embodiment, the hidden pattern is formed by providing transparent coatings 6, 8 only on those microspheres 4 which form the pattern elements. The remaining microspheres 4' have no transparent coating and, thus, are not retroreflective. When viewed without direct illumination, the pattern is not visible. However, when illuminated, the pattern becomes visible due to the fact that microspheres 4 forming the pattern elements are retroreflective. This embodiment provides a consistent feel across the surface of tape 72 since microspheres 4, 4' are distributed across the entire surface of tape 72 and are substantially coplanar with one another.

In another preferred embodiment, as seen in FIG. 10, binder layer 10 is colored but covers only a portion of carrier web 14, such that retroreflective microspheres are disposed on only a portion of tape 102, forming pattern elements. In this embodiment, portions 40 of carrier web 14 which are not covered have substantially the same color as binder layer 10. Thus, when viewed without direct illumination, all portions of tape 102 appear the same and the pattern is substantially hidden. The pattern is revealed when illuminated with a light source.

Figure 7:
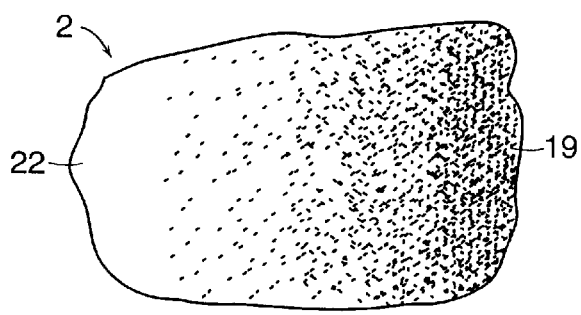
FIG. 7 is a schematic plan view, shown partially cut away, of a differentially retroreflective pattern element of the present invention.

In certain preferred embodiments, portions of tape 2 are differentially retroreflective. Differentially retroreflective, as used herein, refers to a gradation of retroreflectivity. That is, the retroreflectivity is not uniform, but, rather, varies across a portion of the tape. The gradation of retroreflectivity may be within a particular pattern element or from one pattern element to another. An example of differential retroreflectivity is seen in FIG. 7, where there is no sharp boundary between retroreflective pattern element 19 and its non-retroreflective background 22, but, rather, a gradual, visible, change from retroreflective to non-retroreflective. Pattern elements which are differentially retroreflective include, for example, clouds, waves, flames, flowers, images, and logos.

Figure 11:
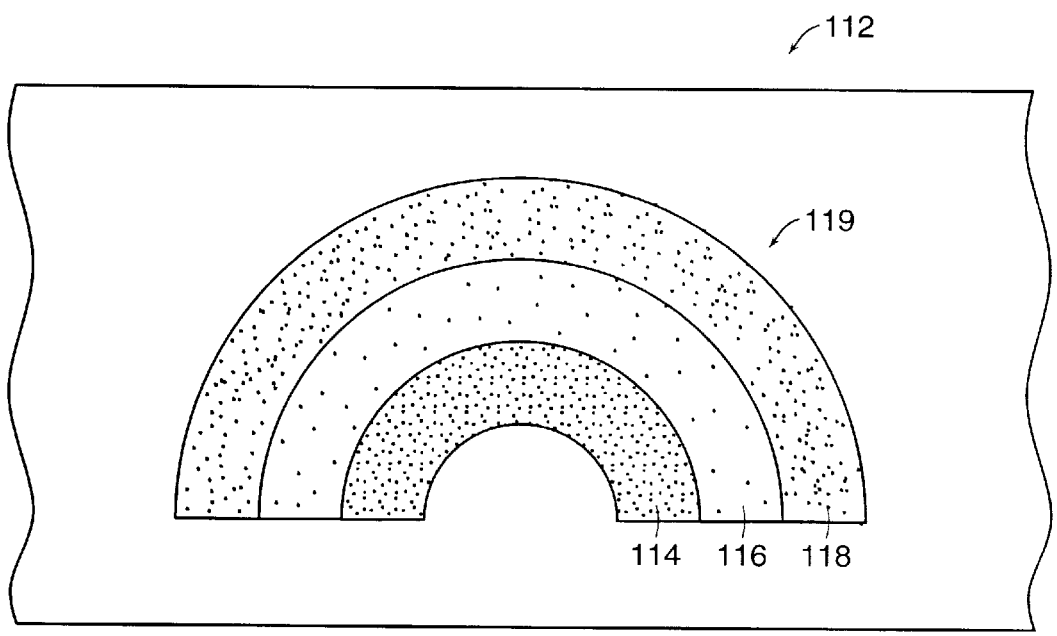
FIG. 11 is a schematic plan view, shown partially cut away, of yet another alternative embodiment of the flexible retroreflective adhesive material of FIG. 1.

In another preferred embodiment, shown in FIG. 11, tape 112 has several portions 114, 116, 118, each having a different and distinct level of retroreflectivity. The portions having distinct levels of retroreflectivity may be within pattern element 119, as shown, or may be distributed among multiple pattern elements. The level of retroreflectivity in a portion of a pattern element is controlled by the use of retroreflective microspheres of different and distinct levels of retroreflectivity.

Carrier web 14, in certain preferred embodiments, has a thickness of approximately 75 to 400 microns. Carrier web 14 is preferably formed of fabric. In certain embodiments, carrier web 14 is formed of nonwoven fabric. Carrier web 14 is more preferably formed of woven fabric. Such fabric is preferably cloth, more preferably woven cloth, and most preferably natural fiber woven cloth. Exemplary suitable fabrics include cotton, linen, hemp, rayon, and blends thereof. Other suitable fabrics will be apparent to those skilled in the art, given the benefit of this disclosure.

In certain preferred embodiments, carrier web 14 may be formed of non-fabric materials. Non-fabric materials may include synthetic fibers, e.g. olefin, nylons, polyesters, aramid, and acrylics; plastic films formed of olefin, nylons, polyesters or polyurethanes; or other non-fabric materials such as fiberglass, carbon fiber, steel, or copper. Other suitable materials for forming carrier web 14 will be readily apparent to those skilled in the art, given the benefit of this disclosure.

Figure 8:
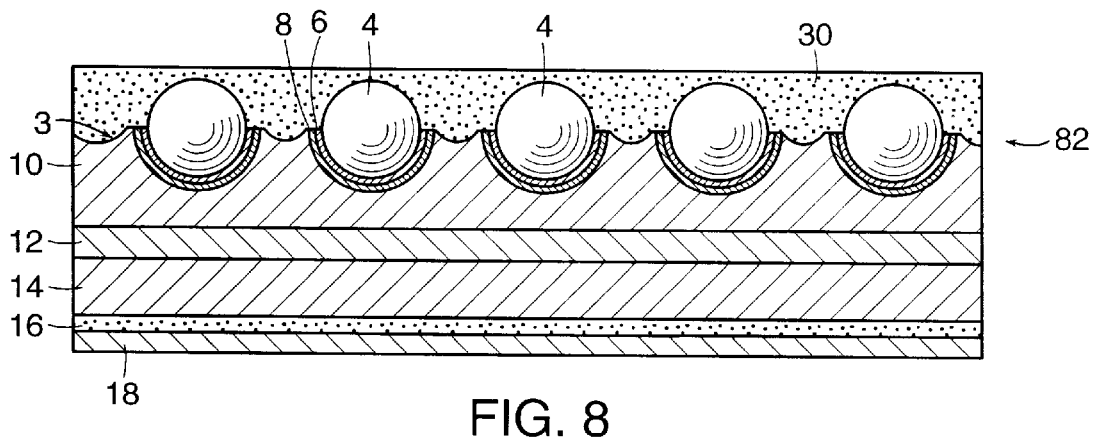
FIG. 8 is a schematic section view, shown partially cut away, of an alternative embodiment of the flexible retroreflective adhesive material of FIG. 1.

In certain preferred embodiments, tape 2 is water-resistant, passing ISO Test No. 105-X12, with a value of at least 3.0, or AATCC Test No. 9-1995, with a value of at least 3.5. In other preferred embodiments, tape 2 is waterproof, passing ISO Test No. 105-X12, with a value of at least 4.5, or AATCC Test No. 9-1995, with a value of at least 4.5. As seen in FIG. 8, tape 82 may be made waterproof or water-resistant by overlaying protective layer 30 on the surface of retroreflective sheet 3. Protective layer 30 is preferably transparent to visible light. Protective layer 30 may be formed by skim coating a liquid over retroreflective sheet 3 which then dries to form protective layer 30. Suitable liquids for skim coating include acrylics, urethanes and vinyl. In other preferred embodiments, protective layer 30 is a sheet or film which is laminated to retroreflective sheet 3. Suitable laminates include olefin, polyester, and urethane. In other preferred embodiments, protective layer 30 may be formed by extrusion or coating. Protective layer 30 may be extruded simultaneous to bonding adhesive 12 being applied to binder layer 10. Suitable materials for extrusion include olefin and urethane.

Figure 13:
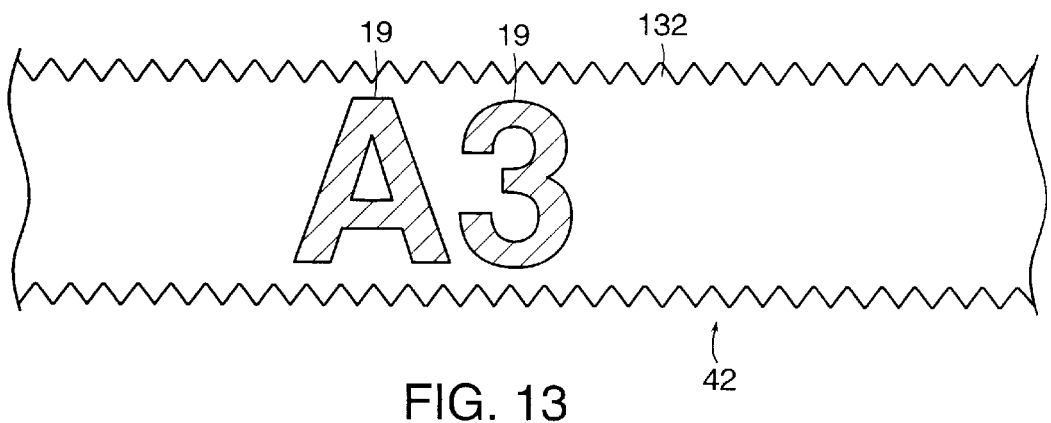
FIG. 13 is a schematic plan view, shown partially cut away, of another alternative embodiment of the flexible retroreflective adhesive material of FIG. 1.

In another preferred embodiment, as seen in FIG. 13, longitudinal edge 130 of tape 132 is non-linear. Edge 130 may be, for example, pinked, scalloped, kinked, or have any other non-linear characteristic. Making edge 130 non-linear helps to ease the start of a transverse tear of tape 132, and may also reduce cloth residue when tape 132 is formed of fabric. Suitable non-linear finishes to edge 130 will become readily apparent to those skilled in the art, given the benefit of this disclosure.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

What is claimed is:

1. A flexible retroreflective adhesive material comprising, in combination:
a carrier web;
a retroreflective composition layer carrying pattern elements on selected portions of the carrier web, comprising retroreflective elements protruding from a surface of a binder layer adhered to the carrier web; and
a pressure sensitive adhesive layer;
wherein the flexible retroreflective adhesive material is clean-edge hand tearable through the pattern elements.

2. The flexible retroreflective adhesive material according to claim 1, wherein the retroreflective composition layer forms a repeating pattern of the pattern elements on the carrier web.

3. The flexible retroreflective adhesive material according to claim 1, wherein the pattern elements include alphanumeric symbols.

4. The flexible retroreflective adhesive material according to claim 1, wherein portions of the carrier web not covered by the retroreflective composition layer are substantially the same color as the retroreflective composition layer.

5. The flexible retroreflective adhesive material according to claim 1, wherein portions of the carrier web not covered by the retroreflective composition layer are covered by a non-retroreflective composition which, other than being non-retroreflective, has substantially the same appearance as the retroreflective composition layer.

6. The flexible retroreflective adhesive material according to claim 5, wherein the non-retroreflective composition has substantially the same color as the retroreflective composition layer and comprises non-retroreflective elements substantially coplanar with the retroreflective elements.

7. The flexible retroreflective adhesive material according to claim 6, wherein the non-retroreflective elements protrude from the surface of the binder layer.

8. The flexible retroreflective adhesive material according to claim 1, wherein a release liner overlies an exposed surface of the pressure sensitive adhesive.

9. The flexible retroreflective adhesive material according to claim 1, wherein at least a portion of a pattern element is differentially retroreflective such that there is a gradation of retroreflectivity across the portion.

10. The flexible retroreflective adhesive material according to claim 1, wherein the retroreflective elements comprise substantially transparent microspheres having specularly reflective coatings on rear portions thereof embedded in the binder layer.

11. The flexible retroreflective adhesive material according to claim 1, wherein the pressure sensitive adhesive covers a surface of the carrier web.

12. The flexible retroreflective adhesive material according to claim 1, wherein the carrier web is fabric.

13. The flexible retroreflective adhesive material according to claim 1, wherein the carrier web is a woven fabric.

14. The flexible retroreflective adhesive material according to claim 13, wherein the woven fabric is embedded in the binder layer.

15. The flexible retroreflective adhesive material according to claim 1, wherein the carrier web is a nonwoven fabric.

16. The flexible retroreflective adhesive material according to claim 15, wherein the nonwoven fabric is embedded in the binder layer.

17. The flexible retroreflective adhesive material according to claim 1, wherein the retroreflective material is water-resistant.

18. The flexible retroreflective adhesive material according to claim 1, wherein the retroreflective material is waterproof.

19. The flexible retroreflective adhesive material according to claim 1, wherein the carrier web is secured to the binder layer by adhesive.

20. The flexible retroreflective adhesive material according to claim 1, wherein the binder layer contains a colorant.

21. The flexible retroreflective adhesive material according to claim 1, further comprising a protective layer overlaying the retroreflective composition.

22. The flexible retroreflective adhesive material according to claim 1, wherein a portion of a pattern element has a retroreflectivity level distinct from a retroreflectivity level of a second portion of the pattern element.

23. A flexible retroreflective adhesive tape comprising, in combination:
a carrier web;
a retroreflective composition layer carrying pattern elements on selected portions of the carrier web, comprising retroreflective elements protruding from a surface of a binder layer adhered to the carrier web; and
a pressure sensitive adhesive layer;
wherein the flexible retroreflective adhesive tape is clean-edge hand tearable through the pattern elements.

24. The flexible retroreflective adhesive tape according to claim 23, wherein the tape is wound in a roll.

25. The flexible retroreflective adhesive tape according to claim 23, wherein the tape is clean-edge hand cross tearable in a direction transverse to a longitudinal axis of the tape.

26. The flexible retroreflective adhesive tape according to claim 23, wherein the pattern elements repeat along a length of the tape.

27. The flexible retroreflective adhesive tape according to claim 23, wherein a longitudinal edge of the tape is non-linear.

28. A flexible retroreflective adhesive material comprising, in combination:
a carrier web;
a retroreflective composition layer carrying pattern elements on selected portions of the carrier web, comprising retroreflective elements protruding from a surface of a binder layer adhered to the carrier web, portions of the carrier web not covered by the retroreflective composition layer being covered by a non-retroreflective composition which, other than being non-retroreflective, has substantially the same appearance and color as the retroreflective composition layer; and
a pressure sensitive adhesive layer;
wherein the flexible retroreflective adhesive material is clean-edge hand tearable through the pattern elements.

* * * * *